United States Patent [19]
Chang

[11] Patent Number: 6,075,533
[45] Date of Patent: Jun. 13, 2000

[54] METHOD OF UTILIZING A THREE-DIMENSIONAL MOUSE IN THE WINDOWS OPERATING SYSTEMS

[75] Inventor: Ming-Chih Chang, Taipei, Taiwan

[73] Assignee: Primax Electronics Ltd., Taiwan

[21] Appl. No.: 08/941,068

[22] Filed: Sep. 30, 1997

[30] Foreign Application Priority Data

Jul. 19, 1997 [TW] Taiwan ................................. 86110246

[51] Int. Cl.$^7$ ........................................ G09G 5/34
[52] U.S. Cl. ........................... 345/341; 345/123; 345/163
[58] Field of Search ................................. 345/440, 127, 345/123, 342, 438, 163, 167, 355, 341, 434, 184; 395/183.14

[56] References Cited

U.S. PATENT DOCUMENTS

| | | | |
|---|---|---|---|
| 5,359,703 | 10/1994 | Robertson et al. | 345/355 |
| 5,495,566 | 2/1996 | Kwatinetz | 345/341 |
| 5,561,445 | 10/1996 | Miwa et al. | 345/167 |
| 5,652,603 | 7/1997 | Abrams | 345/184 |
| 5,726,687 | 3/1998 | Belfiore et al. | 345/341 |

OTHER PUBLICATIONS

Business Wire DATELINE: FREMONT, Calif. Logitech annonces worldwide availability of MAGELLAN 3D Controller, Apr. 14, 1997.

News Realse DATELINE: LAS VEGAS, NV Logitech announces THREE–DIMENSIONAL MOUSE FOR MULTIPLE ENVIRONMENTS, Jul. 30, 1991.

Primary Examiner—Abdollah Katbab
Assistant Examiner—Tadesse Hailu
Attorney, Agent, or Firm—Rabin & Champagne, P.C.

[57] ABSTRACT

A method for utilizing a three-dimensional (3-D) mouse in a graphic-user-interface based operating system, such as the WINDOWS operating systems from Microsoft Corporation, is provided. This method allows the 3-D mouse to emulate the functions of the IntelliMouse from Microsoft Corporation, including control of the scroll bars of the active window and special functions such as the auto-scrolling operation and the fast-scrolling operation. Provided that the active window is able to read IntelliMouse-compliant windows commands, the 3-D mouse can also be used to carry out the standard IntelliMouse functions, such as scrolling the scroll bars and resizing the active window.

19 Claims, 4 Drawing Sheets

METHOD OF UTILIZING A THREE-DIMENSIONAL MOUSE IN THE WINDOWS OPERATING SYSTEMS

BACKGROUND OF THE INVENTION

1. Field of the Invention

This invention relates to computer-related methods, and more particularly, to a method for utilizing a three-dimensional (3-D) mouse in graphic-user-interface based operating systems, such as the WINDOWS operating systems from the Microsoft Corporation, that use windows to interact with the user.

2. Description of Related Art

The WINDOWS 95 operating system from the Microsoft Corporation provides a multi-tasking graphic user interface environment that allows the IBM-compatible PC (personal computer) users to operate the PC easily and conveniently by using a pointing device, such as a mouse. In the WINDOWS environment, various viewing areas called windows allow the user to interact with the multitasking applications running under the operating system. A window is typically composed of a workspace, drop-down menus, and scroll bars that allows the user to edit documents, retrieve database information, making spreadsheets and charts, writing programs, and various other computer-based works. The scroll bars typically include a vertical scroll bar and a horizontal bar that allow the user to scroll through the document or information displayed through the window in various directions. To use the scroll bars, the user needs to use the pointing device to move the pointer on the screen to the scroll bars and then press on the active areas of the scroll bars to scroll through the displayed document.

One drawback to the conventional pointing devices, however, is that it is not quite easy to quickly and accurately pinpoint the pointer on the scroll bars. Moreover, it is usually time-consuming and laborious to use the scroll bars to scroll through the document to a certain page, particularly when the document is a lengthy one.

As a solution to the foregoing problem, the Microsoft Corporation has introduced a wheel-type mouse called IntelliMouse that allows the user to easily and effortlessly operate the scroll bars by means of rolling or pressing the wheel thereon to perform certain functions very quickly, such as resizing the windows and fast scrolling the document. The Microsoft Corporation has set forth a new standard, called IntelliMouse Standard, which defines a signal format for the wheel-activated control signals from the IntelliMouse. Based on the IntelliMouse Standard, the wheel-activated control signals can be converted into windows-acceptable commands that are used to control the scrolling of the document currently being in the active window (or called foreground window). When the driver program of the IntelliMouse receives any wheel-activated control signals from the IntelliMouse, it passes these signals to a hidden window which processes these signals in accordance with the IntelliMouse Standard so as to thereby generate correspondimg windows-acceptable commands (hereinafter referred to as "IntelliMouse-compliant windows commands") that are then transferred to the active window. In response to the IntelliMouse-compliant windows command, the active window will control its child window to carry out the specified actions, such as resizing the window or scrolling the active document. In the event that the active window is unable to read the IntelliMouse-compliant windows commands, no actions will be carried out. Applications that are able to read the IntelliMouse-compliant windows command that are generated in accordance with the IntelliMouse Standard are those specifically designed for running under the WINDOWS 98 operating system, such as Microsoft Office 97 and Internet Explorer 3.0. Since the IntelliMouse Standard is a new standard, old applications that are specifically designed for running under the earlier WINDOWS 95 operating system, such as the Microsoft Office 95, are unable to accept the IntelliMouse-compliant windows commands. Therefore, the use of the IntelliMouse is only limited to those applications that can compatible with the IntelliMouse Standard. For users of the earlier WINDOWS 95 operating system, there exists a need for a means that allows them to use the IntelliMouse on their PCs.

SUMMARY OF THE INVENTION

It is therefore a primary objective of the present invention to provide a method for utilizing a 3-D mouse in the WINDOWS 95 operating system, or broadly speaking, in any windows-based operating systems.

In accordance with the foregoing and other objectives of the present invention, a method for utilizing a 3-D mouse in windows-based operating systems is provided. This method allows the 3-D mouse to emulate the functions of the IntelliMouse from Microsoft Corporation, including the controlling of the scroll bars of the active window, the auto-scrolling operation, and the fast-scrolling operation. Provided that the active window is able to read IntelliMouse-compliant windows commands, the 3-D mouse can be used to carry out the special functions offered by the IntelliMouse, such as the fast-scrolling operation and the resizing of the active window. Provided that the active window is unable to read IntelliMouse-compliant windows command, the 3-D mouse can be used to perform some common functions of the IntelliMouse, such as scrolling the scroll bars, auto-scrolling operation, and fast-scrolling operation.

Broadly speaking, the method of the invention includes the following procedural steps:

(1) manually operating the 3-D mouse to generate a third-dimensional signal representing either a standard scrolling operation mode, an auto-scrolling operation mode, or a fast-scrolling operation mode;

(2) checking current setting of User Windows Operation Mode;

(2-1) provided that the current User Windows Operation Mode is set to Inhibit Mode, ignoring the third-dimensional signal;

(2-2) provided that the current User Windows Operation Mode is set to IntelliMouse Mode, generating a corresponding IntelliMouse-compliant windows command in response to the third-dimensional signal to the active window;

(2-3) provided that the current User Windows Operation Mode is set to Standard Mode, jumping to step (3); and (2-4) provided that the current User Windows Operation Mode is set to Auto Mode, checking whether the active window is able to read any IntelliMouse-compliant windows commands;

if yes, generating and sending a corresponding IntelliMouse-compliant windows command in response to the third-dimensional signal to the active window;

whereas if no, jumping to step (3);

(3) checking whether the third-dimensional signal represents the standard scrolling operation, the auto-scrolling operation, or the fast-scrolling operation;

(3-1) provided that the third-dimensional signal represents the standard scrolling operation mode, performing a standard scrolling operation on the document currently being displayed in the active window;

(3-2) provided that the third-dimensional signal represents the auto-scrolling operation mode, performing an auto-scrolling operation on the document currently being displayed in the active window; and (3-3) provided that the third-dimensional signal represents the fast-scrolling operation mode, performing a fast-scrolling operation on the document currently being displayed in the active window.

In preferred embodiment, the third-dimensional signal representing a standard scrolling operation mode is generated by rolling the wheel on the 3-D mouse; the third-dimensional signal representing an auto-scrolling operation mode is generated by pressing the wheel on the 3-D mouse once; and the third-dimensional signal representing a fast-scrolling operation mode is generated by continuously pressing the wheel on the 3-D mouse.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
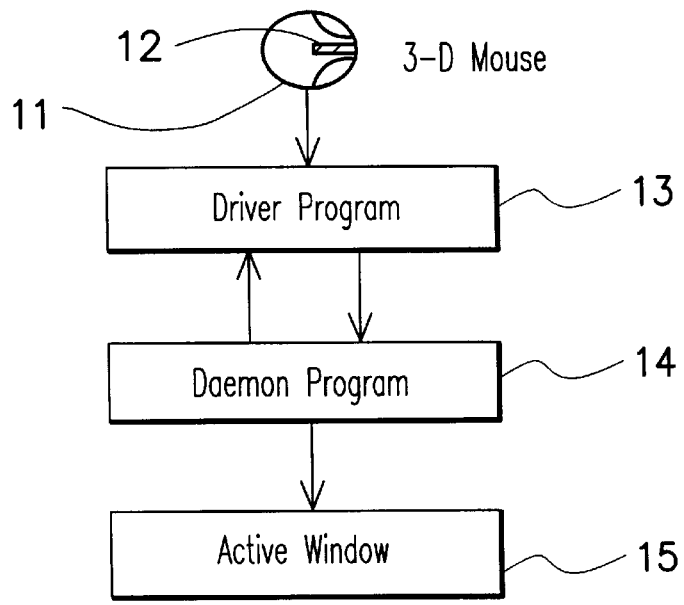
FIG. 1 is a schematic diagram used to depict the signal flow of the wheel-activated control signals generated by a 3-D mouse.

FIG. 1 is a schematic diagram showing a 3-D mouse 11 having a wheel 12 and the signal flow of the wheel-activated control signals from the 3-D mouse 11 to various programs running under a conventional windows-based operating system on a PC (not shown) including a driver program 13, a daemon program 14, and the active window 15. The 3-D mouse 11 is so named because, in addition to the two-dimensional displacement signals that are typical to a conventional mouse, a third-dimensional signal can be generated by operating the wheel 12 in various manners. In the case of the 3-D mouse 11, the third-dimensional signal is also referred to as a "wheel-activated control signal". The two-dimensional displacement signals from the 3-D mouse 11 are conventionally used for control of the mouse pointer on the screen, which are hereinafter collectively referred to as "pointer-control signal").

When the user operates the 3-D mouse 11, both of the pointer-control signal and the wheel-activated control signal therefrom are first sent to the driver program 13. The daemon program 14, which runs as a hidden window, then fetches the wheel-activated control signal from the driver program 13. If the wheel-activated control signal is generated due to the user pressing down on the wheel 12, the daemon program 14 will request the driver program 13 to stop transferring the pointer-control signal to the operating system, but instead transfer the pointer-control signal to the daemon program 14. In accordance with the currently set User Windows Operation Mode by the user, the daemon program 14 will send a corresponding IntelliMouse-compliant windows command, which is generated in accordance with the IntelliMouse Standard in response to the received wheel-activated control signal, to the active window 15 and use it directly to control the scrolling of the document currently being displayed in the active window 15.

If the currently set User Windows Operation Mode is the Inhibit Mode, the daemon program 14 will ignore the wheel-activated control signal from the 3-D mouse 11. In the case of the daemon program 14 sending a IntelliMouse-compliant windows command to the active window 15, if the active window 15 is able to read the IntelliMouse-compliant windows command, the active window 15 will perform the specified action, such as resizing its dimensions or scrolling the document currently being displayed therein. However, if the active window 15 is unable to read the IntelliMouse-compliant windows command, the command will be ignored and no actions will be carried out. In the case of the daemon program 14 directly controlling the scroll bars in the active window 15, the daemon program 14 will generate and send a standard windows command to the active window 15 which is able to read the standard windows command and accordingly carries out the requested actions.

In accordance with the invention, the 3-D mouse 11 is able to emulate the following four functions that are set forth in the IntelliMouse Standard for the IntelliMouse from the Microsoft Corporation:

| The manner in which the wheel on the 3-D mouse is operated | Corresponding Functions (similar to the IntelliMouse) |
| --- | --- |
| A1 Rolling the wheel | Scrolling the scroll bars |
| A2 Rolling the wheel while pressing down the Ctrl key | Resizing the active window |
| A3 Pressing the wheel once | Performing an auto-scrolling operation |
| A4 Pressing the wheel continuously | Performing a fast-scrolling operation |

Figure 2A:
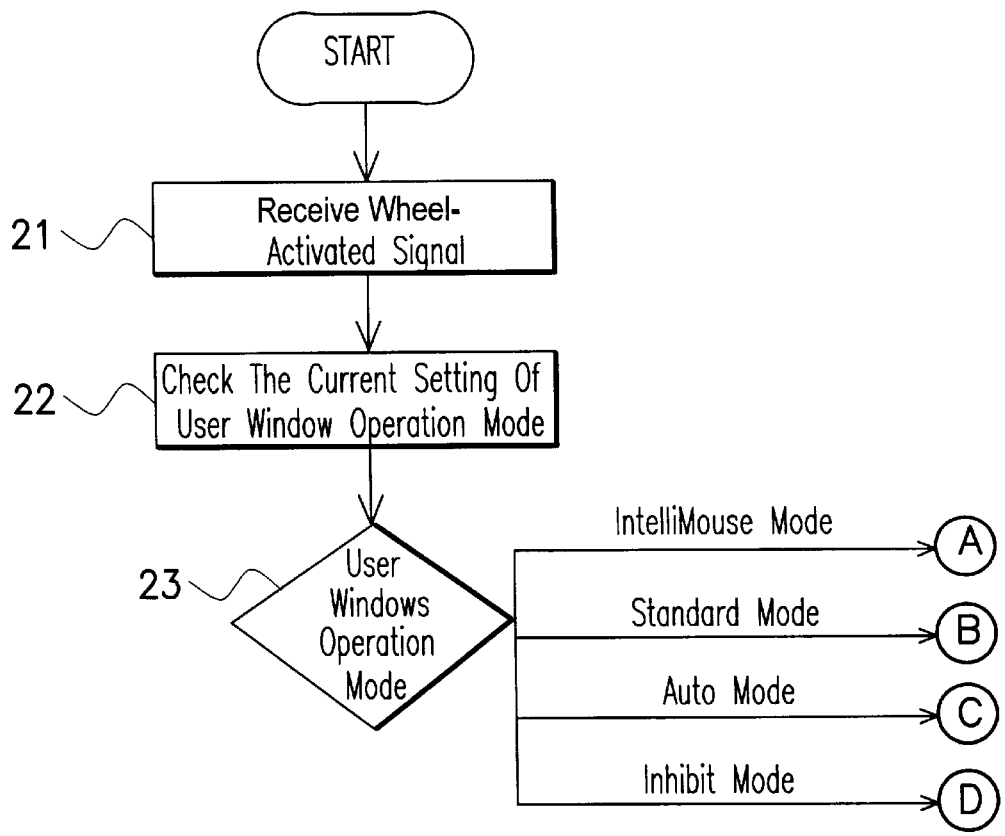
FIG. 2A is a flow chart showing the procedural steps carried out by a daemon routine devised in accordance with the method of the invention.

FIG. 2A is a flow diagram showing the procedural steps carried out by the daemon program in accordance with the invention. In the first step 21, the daemon program receives a wheel-activated control signal from the 3-D mouse. In the next step 22, the daemon program detects whether the currently set User Windows Operation Mode is (A) IntelliMouse Mode, (B) Standard Mode, (C) Auto Mode, or (D) Inhibit Mode. The setting of the desired mode is achieved by means of a control panel that can be displayed on the screen by the setup program of the 3-D mouse. The control panel contains two selection buttons: a IntelliMouse Mode button and a Standard Mode button. The user can set the User Windows Operation Mode to any one of the above-mentioned four options by using the two selection buttons in the following manner:

| To set to the following mode | Do the following |
| --- | --- |
| B1 IntelliMouse Mode | Check the IntelliMouse Mode button. |
| B2 Standard Mode | Check the Standard Mode button. |

| To set to the following mode | Do the following |
|---|---|
| B3 Auto Mode | Check both of the IntelliMouse Mode button and the Standard Mode button. |
| B4 Inhibit Mode | Check none of the IntelliMouse Mode button and the Standard Mode button. |

Figure 2B:
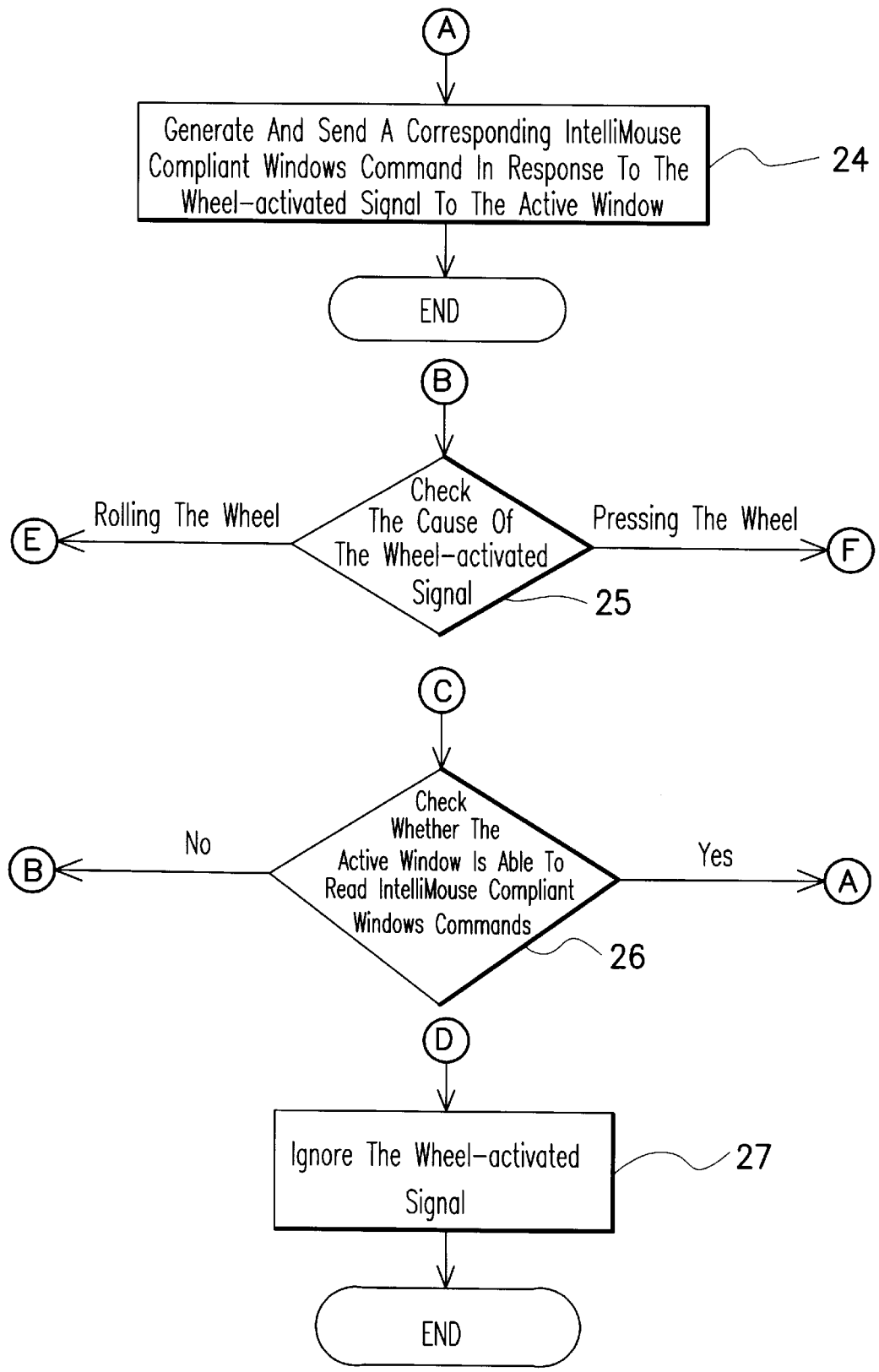
FIG. 2B is a flow chart showing the procedural steps following the flow chart of FIG. 2A.

In the next step 23, if the IntelliMouse Mode is selected, the procedure goes to the step 24 shown in FIG. 2B; if the Standard Mode is selected, the procedure goes to the step 25 in FIG. 2B; if the Auto Mode is selected, the procedure goes to the step 26 in FIG. 2B; and if the Inhibit Mode is selected, the procedure goes to the step 27 in FIG. 2B.

In the step 24, the daemon program generates a corresponding IntelliMouse-compliant windows command in response to the received wheel-activated control signal from the 3-D mouse to the active window, thus commanding the active window to perform the specified actions. In the step 25, the daemon program checks whether the wheel-activated control signal was actuated by the rolling or by the pressing of the wheel. If by the rolling of the wheel, the procedure goes to the step 31 shown in FIG. 2C; whereas if by the pressing of the wheel, the procedure goes to the step 38 in FIG. 2C. In the step 26, the daemon program checks whether the active window is able to read IntelliMouse-compliant windows commands. If YES, the procedure goes to the step 24; whereas if NOT, the procedure goes to the step 25. In the step 27, the daemon program ignores the wheel-activated control signal, and therefore no actions will be carried out.

Figure 2C:
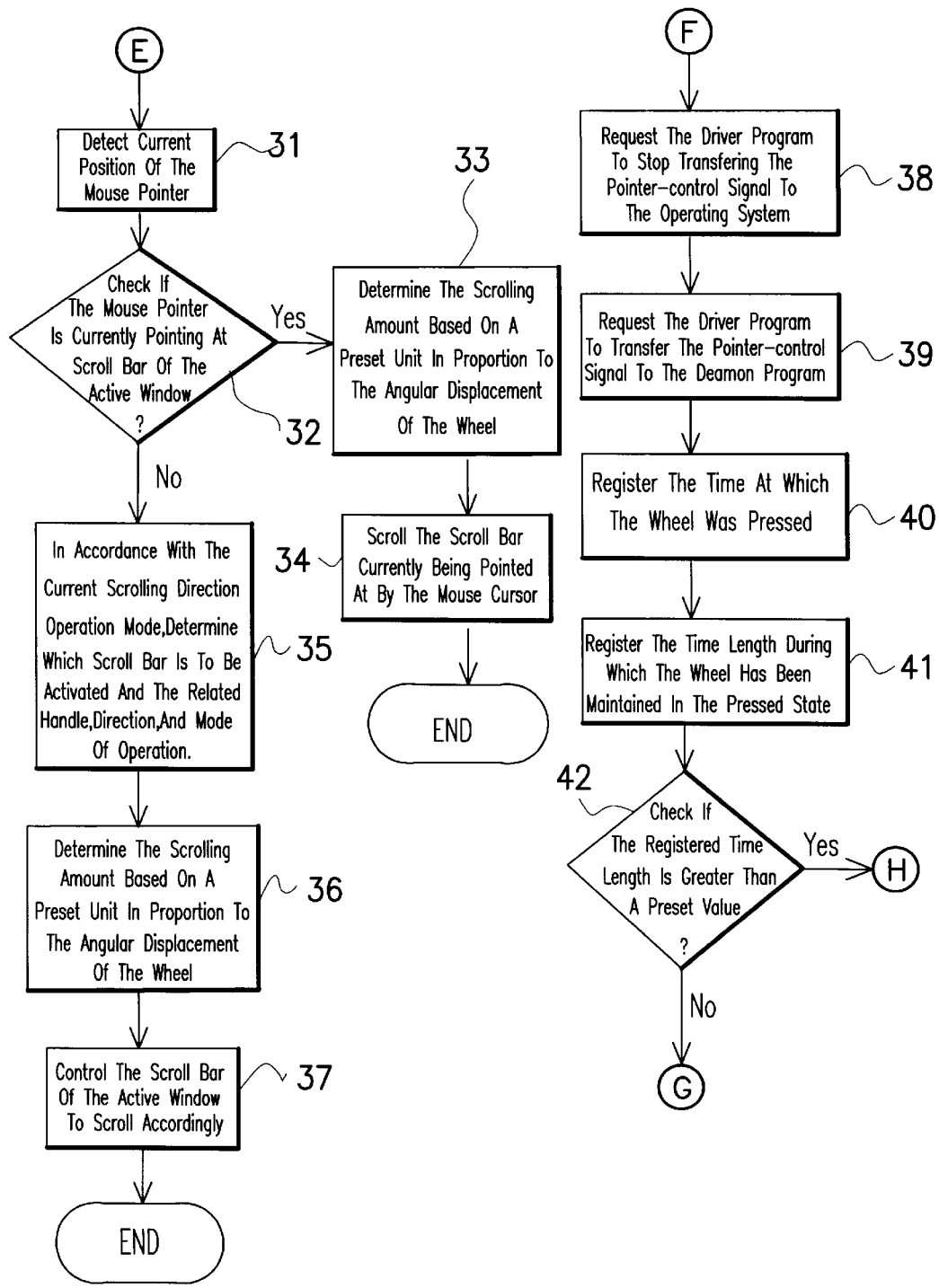
FIG. 2C is a flow chart showing the procedural steps following the flow chart of FIG. 2B.

Referring further to FIG. 2C, in the step 31 following the step 25 in FIG. 2B, the daemon program detects the current position of the mouse pointer. In the next step 32, the daemon program checks whether the current position of the mouse pointer is on any of the scroll bars of the active window. If YES, the procedure goes to the step 33, whereas if NOT, the procedure goes to the step 35.

In the step 33, the daemon program determines the amount of scrolling in accordance with the angular displacement of the wheel on the 3-D mouse (i.e., the number of revolutions the wheel has been rolled); and then in the next step 34, the daemon program commands the scroll bar currently being pointed by the mouse pointer to scroll accordingly. In this preferred embodiment, for example, the scrolling amount is obtained in such a manner that each unit of the angular displacement of the wheel on the 3-D mouse will cause the scroll bar to scroll through three lines of the document currently being displayed in the active window.

In the step 35, in which case the mouse pointer is currently not positioned on any of the scroll bars of the active window, the daemon program will determine (in accordance with the currently set Scrolling Direction Control Mode) which one of the scroll bars of the active window (vertical or horizontal) is the most likely one that is related to the desired action by the received wheel-activated control signal, and also determine the related handle, direction, and mode of operation. In the next step 36, the daemon program determines the amount of scrolling in accordance with the angular displacement of the wheel on the 3-D mouse; and then in the next step 37, the daemon program commands the scroll bar currently being pointed by the mouse pointer to scroll accordingly.

The Scrolling Direction Control Mode can be set by means of three buttons on the control panel of the 3-D mouse, as given in the following table:

| Button Name | Function |
|---|---|
| C1 X-axis Mode button | The horizontal scroll bar is activated to scroll horizontally. |
| C2 Y-axis Mode button | The vertical scroll bar is activated to scroll vertically. |
| C3 Proximation Mode button | The one of the horizontal and vertical scroll bars that is proximate to the mouse pointer is activated. |

Moreover, the currently activated one of the scroll bars can be changed to the other (i.e., from horizontal to vertical or from vertical to horizontal) by pressing the Shift key on the key-board while rolling the wheel on the 3-D mouse.

Further in FIG. 2C, in the step 38 following the step 25 in FIG. 2B, in which case the wheel-activated control signal was generated by the pressing of the wheel on the 3-D mouse, the daemon program requests the driver program to stop transferring the pointer-control signal to the operating system. In the next step 39, the daemon program requests the driver program to transfer the pointer-control signal to it. In the next step 40, the daemon program checks and registers the time at which the wheel on the 3-D mouse was pressed; and then in the next step 41, the daemon program checks and registers the time length during which the wheel has been maintained in the pressed state. In the next step 42, the daemon program checks whether the time length is greater than a preset value. If NO, the procedure goes to the step 43 in FIG. 2D, in which case the daemon program will carry out an auto-scrolling operation; whereas if YES, the procedure goes to the step 48 in FIG. 2D, in which case the daemon program will carry out a fast-scrolling operation. In this preferred embodiment, for example, the preset value of time length is 0.2 sec.

Figure 2D:
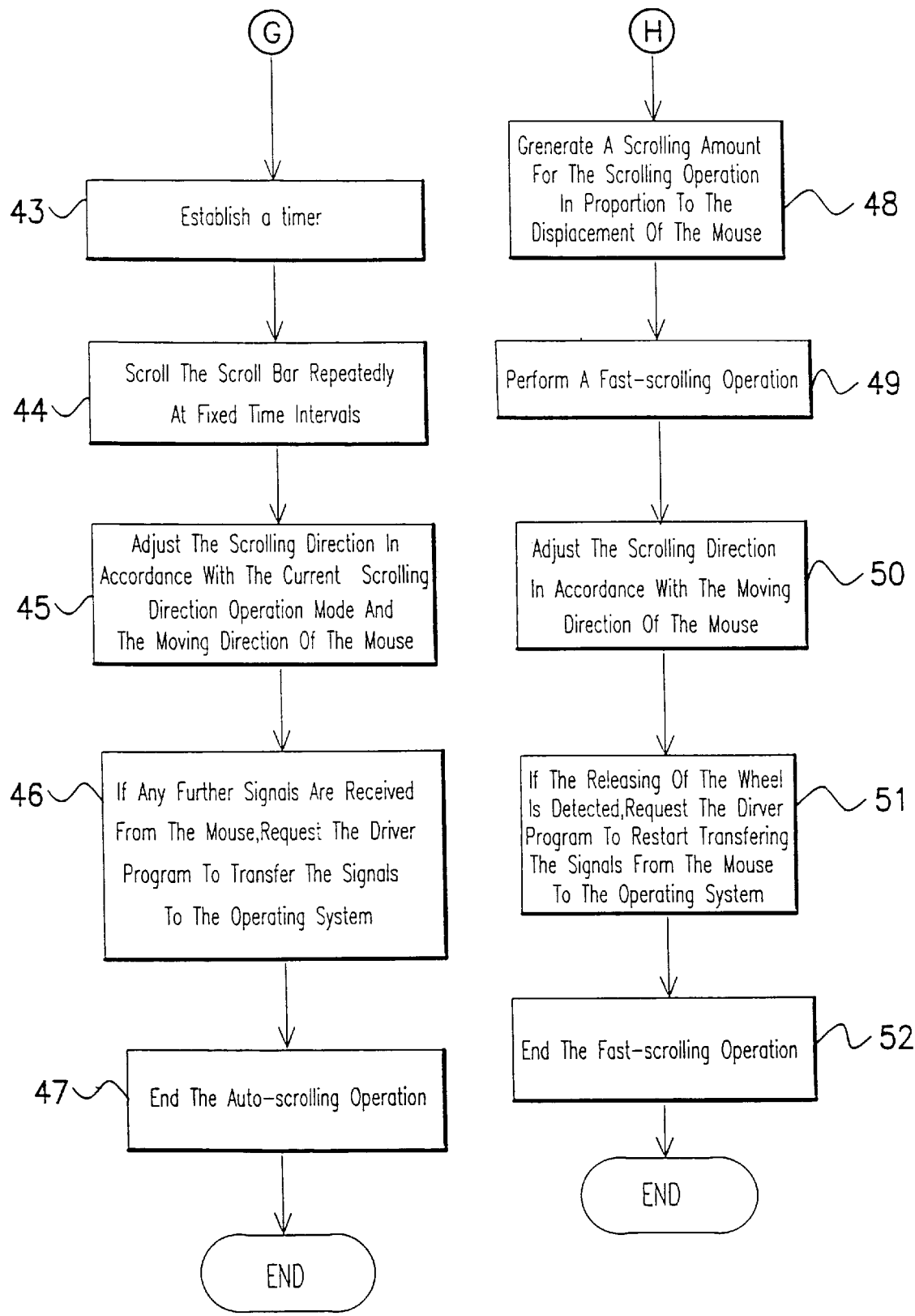
FIG. 2D is a flow chart showing the procedural steps following the flow chart of FIG. 2C.

Referring to FIG. 2D, in the case of carrying out an auto-scrolling operation, the procedure first goes to the step 43, in which the daemon program builds a timer. In the next step 44, the daemon program scrolls repeatedly the document currently being displayed in the active window at preset time intervals set by the timer. Each round of the scrolling moves the document up or down by a preset amount, for example one page or five lines at a time. In the step 45, the daemon program controls the scrolling direction of the document in accordance with the moving direction of the 3-D mouse and the currently set Scrolling Direction Control Mode. If the 3-D mouse is being moved, the scrolling direction will agree with the moving direction of the 3-D mouse; whereas if not being moved, the scrolling direction will be based on the currently set Scrolling Direction Control Mode, i.e., either one of the X-axis Mode, the Y-axis Mode, or the Proximation Mode. In the next step 46, if the daemon program again receives any signals (due to pressing of the mouse button or rolling or pressing of the wheel) from the 3-D mouse, it will request the driver program to transfer these signals to the operating system. In the next step 47, the auto-scrolling operation is ended.

In the case of carrying out a fast-scrolling operation, the procedure first goes to the step 48, in which the daemon program obtains a scrolling amount in proportion to the linear displacement of the 3-D mouse. In the next step 49, the daemon program scrolls the document currently being displayed in the active window by a displacement equal to the scrolling amount. In the next step 50, the daemon program controls the scrolling direction in response to the mouse movement. If the mouse is being moved, the scrolling direction will agree with the moving direction of the mouse;

whereas if the mouse is not being moved, no scrolling will be carried out. In the next step 51, the daemon program detects whether the pressed wheel has been released. If YES, the daemon program requests the driver program to transfer the newly generated mouse signals to the operating system. In the step 52, the fast-scrolling operation is ended.

When the 3-D mouse is performing a fast-scrolling operation, the daemon program will change the shape of the mouse pointer in accordance with the scrolling directions. For instance, in the case of scrolling the document upwards, the mouse pointer will be changed to the shape ↑; in the case of scrolling downwards, the shape ↓; in the case of scrolling right, the shape ←; and in the case of scrolling left, the shape →.

In the 3-D mouse, the wheel-activated control signal acts as a signal of the third dimension which is so-named because that the wheel-activated control signal is generated due to a third-dimensional movement from the 3-D mouse. It will be apparent to those skilled in the art that means for generating the third-dimension signal is not limited to the use of a wheel on the 3-D mouse. Instead, various other mechanical means, such as a ball or a joystick, can be used. The provision of the third-dimensional signal allows for more various controls on the scrolling operations.

The wheel-activated control signal can be actuated by any of the following three operations on the wheel on the 3-D mouse: (1) rolling the wheel; (2) pressing the wheel once; and (3) continuously pressing the wheel. In the preferred embodiment of the invention, the corresponding functions that will be carried out due to these operations are scrolling the document performing an auto-scrolling operation, and performing a fast-scrolling operation. However, it will be apparent to those skilled in the art that the corresponding functions can be variously changed in accordance with particular specifications of the utilization. Fundamentally, each action on the active window is initiated by a certain operation on the wheel on the 3-D mouse.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for utilizing a 3-D mouse in a graphic-user-interface based operating system which uses an active window having scrolling means including at least a horizontal scroll bar and a vertical scroll bar to interact with the user, said method comprising the steps of:

(1) manually operating the 3-D mouse to generate a third-dimensional signal representing either a standard scrolling operation mode, an auto-scrolling operation mode, or a fast-scrolling operation mode;

(2) checking current setting of User Windows Operation Mode;

(2-1) provided that the current User Windows Operation Mode is set to Inhibit Mode, ignoring the third-dimensional signal;

(2-2) provided that the current User Windows Operation Mode is set to wheel activated control Mode, generating a corresponding 3D mouse-compliant windows command in response to the third-dimensional signal to the active window;

(2-3) provided that the current User Windows Operation Mode is set to Standard Mode, jumping to step (3); and (2-4) provided that the current User Windows Operation Mode is set to Auto Mode, checking whether the active window is able to read any 3D mouse-compliant windows commands:
      if yes, generating and sending a corresponding 3D mouse-compliant windows command in response to the third-dimensional signal to the active window;
      whereas if no, jumping to step (3);

(3) checking whether the third-dimensional signal represents the standard scrolling operation, the auto-scrolling operation, or the fast-scrolling operation;

(3-1) provided that the third-dimensional signal represents the standard scrolling operation mode, performing a standard scrolling operation on the document currently being displayed in the active window;

(3-2) provided that the third-dimensional signal represents the auto-scrolling operation mode, performing an auto-scrolling operation on the document currently being displayed in the active window; and (3-3) provided that the third-dimensional signal represents the fast-scrolling operation mode, performing a fast-scrolling operation on the document currently being displayed in the active window.

2. The method of claim 1, wherein
the 3-D mouse is of the type using a wheel to generate the third-dimensional signal; and
in said step (1), the third-dimensional signal representing the standard scrolling operation mode is generated by rolling the wheel on the 3-D mouse.

3. The method of claim 2, wherein in said step (3-1), the standard scrolling operation includes the steps of:

(A1) detecting the current position of the mouse pointer;

(A2) if the mouse pointer is on any one of the scroll bars of the active window, scrolling the scroll bar currently being pointed by the mouse pointer;

(A3) if the mouse pointer is currently not positioned on any one of the scroll bars of the active window, determining which one of the scroll bars is the most likely one that is related to the desired action by the received third-dimensional signal and related handle, direction, and mode of operation accordance with the current setting of Scrolling Direction Control Mode; and (A4) scrolling the document currently being displayed in the active window by a scrolling amount in proportion to the angular displacement of the wheel on the 3-D mouse.

4. The method of claim 3, wherein the Scrolling Direction Control Mode includes the options of:

an X-axis Mode, which activates the horizontal scroll bar to scroll through the document currently being displayed in the active window horizontally;

an Y-axis Mode, which activates the vertical scroll bar to scroll through the document currently being displayed in the active window vertically; and a Proximation Mode, which activates the one of the horizontal and vertical scroll bars that is proximate to the mouse pointer.

5. The method of claim 3, further comprising the step of:
switching the currently activated one of the scroll bars to the other in response to the pressing of a keyboard key while rolling the wheel on the 3-D mouse.

6. The method of claim 3, wherein in said step (A4), the scrolling amount is set in such a manner that each unit of the angular displacement of the wheel on the 3-D mouse causes the currently activated one of the scroll bars to scroll three lines of the document currently being displayed in the active window.

7. The method of claim 1, wherein in said step (1), the third-dimensional signal representing the auto-scrolling operation mode is generated by pressing the wheel on the 3-D mouse once.

8. The method of claim 1, wherein in said step (1), the third-dimensional signal representing the fast-scrolling operation mode is generated by continuously pressing the wheel on the 3-D mouse.

9. The method of claim 1, wherein in said step (1), the third-dimensional signal representing the auto-scrolling operation mode is generated by pressing the wheel on the 3-D mouse once; and the third-dimensional signal representing the fast-scrolling operation mode is generated by continuously pressing the wheel on the 3-D mouse.

10. The method of claim 9, further comprising, in the case of the received third-dimensional signal representing the auto-scrolling operation, the following steps of:

(B1) stopping the transfer of the pointer-control signal from the 3-D mouse to the operating system;

(B2) registering the time at which the wheel on the 3-D mouse was pressed;

(B3) registering the time length during which the wheel has been maintained in pressed state;

(B4) comparing the registered time length with a preset value to see if the registered time length is greater than a preset value;

if no, performing an auto-scrolling operation;

whereas if yes, performing a fast-scrolling operation.

11. The method of claim 10, wherein the pointer-control signal includes information that indicates both the moving direction and the linear displacement of the 3-D mouse.

12. The method of claim 10, wherein the preset value of time length is 0.2 sec.

13. The method of claim 10, wherein the auto-scrolling operation includes the steps of:

(C1) establishing a timer;

(C2) scrolling the currently activated one of the scroll bars of the active window repeatedly at fixed time intervals controlled by the timer;

(C3) adjusting the scrolling direction of the currently activated one of the scroll bars of the active window in accordance with the moving direction of the 3-D mouse and the currently selected Scrolling Direction Control Mode;

(C4) in response to any subsequently received signals from the 3-D mouse, transferring the signals to the operating system; and (C5) ending the auto-scrolling operation.

14. The method of claim 13, wherein in said step (C3), the adjusting of the scrolling direction includes the steps of:

provided that the 3-D mouse is being moved, scrolling the document in a direction in agreement with the current moving direction of the 3-D mouse; and provided that the 3-D mouse is not being moved, scrolling the document in a direction in accordance with the currently set Scrolling Direction Control Mode.

15. The method of claim 10, wherein the fast-scrolling operation includes the steps of:

(D1) receiving the third-dimensional signal from the 3-D mouse, and generating a scrolling amount for the scrolling operation in proportion to the linear displacement of the 3-D mouse;

(D2) scrolling through the document by a displacement equal to the scrolling amount determined in said step (D1);

(D3) adjusting the scrolling direction of the document in accordance with the current moving direction of the 3-D mouse;

(D4) releasing the wheel from pressed state, allowing the subsequently generated signals from the 3-D mouse to be transferred to the operating system; and (D5) ending the fast-scrolling operation.

16. The method of claim 15, wherein in said step (D3), the adjusting of the scrolling direction includes the steps of:

provided that the 3-D mouse is not being moved, performing no actions to the scroll bars; and provided that the 3-D mouse is being moved, scrolling the document in a direction in agreement with the current moving direction of the 3-D mouse.

17. The method of claim 15, further comprising the step of:

changing the shape of the mouse pointer in accordance with the current scrolling direction in such a manner that:

the mouse pointer is changed to the shape of an up arrow when scrolling upwards;

the mouse pointer is changed to the shape of a down arrow when scrolling downwards;

the mouse pointer is changed to the shape of a right arrow when scrolling to the right; and the mouse pointer is changed to the shape of a left arrow when scrolling to the left.

18. The method of claim 1, wherein in said step (2), the User Windows Operation Mode is set by using a control panel containing a Standard Mode button and a wheel activated control Mode button in such a manner that the User Windows Operation Mode is set to:

the Standard Mode, provided that the Standard Mode button is selected while the wheel activated control Mode button is not selected;

the wheel activated control Mode, provided that the wheel activated control Mode button is selected while the Standard Mode button is not selected;

the user Auto Mode, provided that both of the wheel activated control Mode button and the Standard Mode button are selected; and the Inhibit Mode, provided that none of the Standard Mode button and the wheel activated control Mode button are not selected.

19. The method of claim 1, wherein the 3-D mouse is of the type using a wheel to generate a wheel-activated control signal acting as the third-dimensional signal; and provided that the wheel-activated control signal is generated by rolling the wheel, the action of scrolling the scroll bars by a preset fixed amount is performed;

provided that the wheel-activated control signal is generated by rolling the wheel while pressing down the Ctrl key, the action of resizing the active window is performed;

provided that the wheel-activated control signal is generated by pressing the wheel once, the auto-scrolling operation is performed; and provided that the wheel-activated control signal is generated by pressing the wheel continuously, the fast-scrolling operation is performed.

* * * * *